United States Patent [19]
Suzuki et al.

[11] 4,135,237
[45] Jan. 16, 1979

[54] INVERTER

[75] Inventors: Tadao Suzuki; Shigeaki Wachi, both of Tokyo, Japan

[73] Assignee: Sony Corporation, Tokyo, Japan

[21] Appl. No.: 846,055

[22] Filed: Oct. 27, 1977

[30] Foreign Application Priority Data

Oct. 30, 1976 [JP] Japan .................................. 51-130764
Oct. 30, 1976 [JP] Japan .................................. 51-130765

[51] Int. Cl.² .......................................... H02M 7/537
[52] U.S. Cl. ......................................... 363/132; 363/17
[58] Field of Search .................... 363/17, 56, 98, 131, 363/132

[56] References Cited

U.S. PATENT DOCUMENTS

| 3,641,405 | 8/1969 | Bishop et al. ..................... 363/132 X |
| 3,691,450 | 9/1972 | Cox ...................................... 363/131 |
| 4,063,306 | 12/1977 | Perkins et al. ..................... 363/132 |

FOREIGN PATENT DOCUMENTS

| 2453 | 3/1967 | Japan ...................................... 363/132 |
| 216104 | 7/1968 | U.S.S.R. ................................. 363/132 |
| 520679 | 9/1976 | U.S.S.R. ................................. 363/132 |

*Primary Examiner*—William M. Shoop
*Attorney, Agent, or Firm*—Hill, Gross, Simpson, Van Santen, Steadman, Chiara & Simpson

[57] ABSTRACT

An inverter includes a pair of switching elements operated by control signals from a signal generator to take two-position action in the same phase or in opposite phases, and a coupling transformer to couple the control signals so that ON actions or ON and OFF actions of the switching elements are synchronized with each other more precisely than circuits of the past have been able to provide.

17 Claims, 8 Drawing Figures

INVERTER

BACKGROUND OF THE INVENTION

1. Field of the Invention

This invention relates to an inverter, and more particularly to an inverter which includes two switching elements effecting switching actions in the same phase or in opposite phases.

2. Description of the Prior Art

A conventional inverter circuit is knwon as a circuit for conversion from DC to AC. A stepped-up or stepped-down DC voltage is obtained by rectifying the AC output of the inverter circuit. The power unit using such inverter circuit needs no power transformer of commercial frequency, and so it can be smaller-sized.

FIG. 1 shows a well-known full bridge inverter circuit which is a kind of such inverter circuit.

The inverter circuit of FIG. 1 comprises a saturable transformer 5 having a hysteresis characteristic and two pairs of transistors for driving the transformer 15, i.e., a pair of transistors 1 and 4 and a pair of transistors 2 and 3. The transistors 1 and 2 form a cascade connection with each other, and transistors 3 and 4 form a cascade connection with each other. Each windings 6, 7, 8 and 9 of the transformer 5 is connected between base and emitter of each transistor 1, 2, 3 and 4. The windings 6 to 9 are wound in the direction that the magnetic flux in a predetermined direction generated in the transformer 5 puts one pair of transistors 1 and 4 or 2 and 3 into the on-state, and simultaneously puts the other pair into the off-state.

The collectors of the transistors 1 and 3 are connected in common to a positive power supply terminal 21. The emitters of the transistors 2 and 4 are connected in common to a negative power supply terminal 22. A primary winding 17 of an output transformer 15 is connected between the connecting point A of the cascade connection of the transistors 1 and 2 and the connecting point B of the cascade connection of the transistors 3 and 4.

The output transformer 15 has the primary winding 17 and secondary windings 16 and 18. A current proportional to the current flowing through the primary winding 17 is fed back to a winding 11 of the transformer 5 through a transformer 14. A voltage proportional to the voltage developed across the primary winding 17 is detected by the secondary winding 16 to be fed back to a winding 10 of the transformer 5. The DC voltage applied to the power supply terminals 21 and 22 is converted to a desired AC voltage which is led out through the secondary winding 18 of the output transformer 15.

The operation of the inverter circuit of FIG. 1 will be described in brief. When starting magnetic flux in the one direction, for example, A-direction of FIG. 1, is developed by a starting winding (not shown), voltages are generated across each windings 6 to 9 to put the pair of transistors 1 and 4 into the on-state and the pair of transistors 2 and 3 into the off-state. In such state, current flows from the positive power supply terminal 21 to the negative power supply terminal 22 through the transistor 1, winding 17, transformer 14 and transistor 4. The change of the current is fed back to the windings 10 and 11 respectively through the windings 17 and 16 of the transformer 15 and the transformer 14, which encourages the starting flux. As the result, the feedback currents to the windings 10 and 11 increases more. Such positive feedback condition is continued until the transformer 5 becomes saturated. When the transformer 5 is saturated, there is no further increase of flux. Thus, voltages are not developed across the windings 6 and 9, so that the transistors 1 and 4 turn into the off-state.

When the transistors 1 and 4 begin to turn off, the flux of the transformer 5 in the direction A decreases, which develops the voltages across the windings 7 and 8 to put the transistors 2 and 3 into the on-state. When the transistors 2 and 3 turn into the on-state and the transistors 1 and 4 turn into the off-state, current flows from the positive power supply terminal 21 to the negative power supply terminal 22 through the transistor 3, transformer 14, winding 17 and transistor 2. The change of the current is fed back to the windings 10 and 11 of the transformer 5, which produces the flux of the transformer 5 in the direction B. The development of the flux increases the feedback currents to the windings 10 and 11. Similarly to the above, the positive feedback condition is continued until the transformer 5 becomes saturated. When the transformer 5 is saturated, the flux is not further increased. Thus, voltages are not developed across the windings 7 and 8, so that the transistors 2 and 3 turn into the off-state.

An alternating output voltage being of approximately square waveform is obtained across the winding 18 of the output transformer 15 through the repetition of such switching operation. Whe waveforms of the base currents $i_{b1} \sim i_{b4}$ of the transistors 1-4 during the switching operation are shown in FIG. 2. Spike at each trailing transitions of the base currents $i_{b1} \sim i_{b4}$ is caused by discharging charges stored in each of the bases of the transistors 1 to 4. The transistors 1 to 4 turn from the on-state into the off-state after discharge of the storage charges.

The base currents $i_{b1}$ and $i_{b2}$, $i_{b3}$ and $i_{b4}$ have the following relation with a current $i_e$ flowing through the winding 10 and a current $i_c$ flowing through the winding 11 caused by feedback;

$$i_{b1} + i_{b4} = i_{b2} + i_{b3} = (Ne/N)i_e + (Nc/N)i_c$$

wherein N represents the number of turns of the windings 6 to 9, Ne represents the number of turns of the winding 10 and Nc represents the number of turns of the winding 11.

In such relation, the base currents $i_{b1} \sim i_{b4}$ under the on-state of the transistors 1 to 4 are expressed as $I_{B1} \sim I_{B4}$, respectively. The case, $I_{B1} \neq I_{B4}$ or $I_{B2} \neq I_{B3}$ occurs due to the unbalance between the base-emitter characteristics caused by thermic circumstances or differences in the characteristics of each transistor. On that occasion, the difference in the amount of base storage charges are caused, which develops the following trouble.

Supposing that $I_{B1} > I_{B4}$, for example, the amount of base storage charges of the transistor 1 becomes larger than that of the transistor 4. As a result, it causes the trouble that the transistor 4 turns into the off-state and the transistors 2 and 3 turn into the on-state, while the transistor 1 still remains on-state. In such a case, a longitudinal current flows from the positive power supply terminal 21 to the negative power supply terminal 22, through collector-emitter of each transistors 1 and 2 being on-state. It decreases the efficiency of the inverter.

SUMMARY OF THE INVENTION

An object of this invention is to provide an improved inverter which overcomes the above-described disadvantages of the conventional inverter.

Another object of this invention is to provide an inverter in which a longitudinal current flowing through two switching elements can be effectively prevented, and thereby which is superior in efficiency.

A further object of this invention is to provide an inverter in which control signals to operate two switching elements in opposite phases are coupled with each other, and thereby it is prevented to put the two switching elements simultaneously into the on-state.

A still further object of this invention is to provide an inverter in which control signals to operate two switching elements in the same phase are coupled with each other, and thereby the two switching elements are forced to be put simultaneously into the on-state and off-state.

A still further object of this invention is to provide an inverter in which control signals to operate switching elements in the same phase and opposite phases are coupled with each other, and thereby a longitudinal current flowing through the two of the switching elements can be prevented.

In accordance with one aspect of this invention, an inverter includes a DC power source having a first and second terminals, switching means having a plurality of switching devices each having first, second and third electrodes and connected between the first and second terminals of the DC power source, control means to supply the first electrode of each of the switching devices with control signals, respectively, and coupling means to couple the control signals to each other, selectively: and AC output means having a pair of output terminals and connected to the switching devices.

The other objects, features and advantages of this invention will be apparent from the following description taken in conjunction with the accompanying drawings.

DESCRIPTION OF THE PREFERRED EMBODIMENTS

Figure 1:
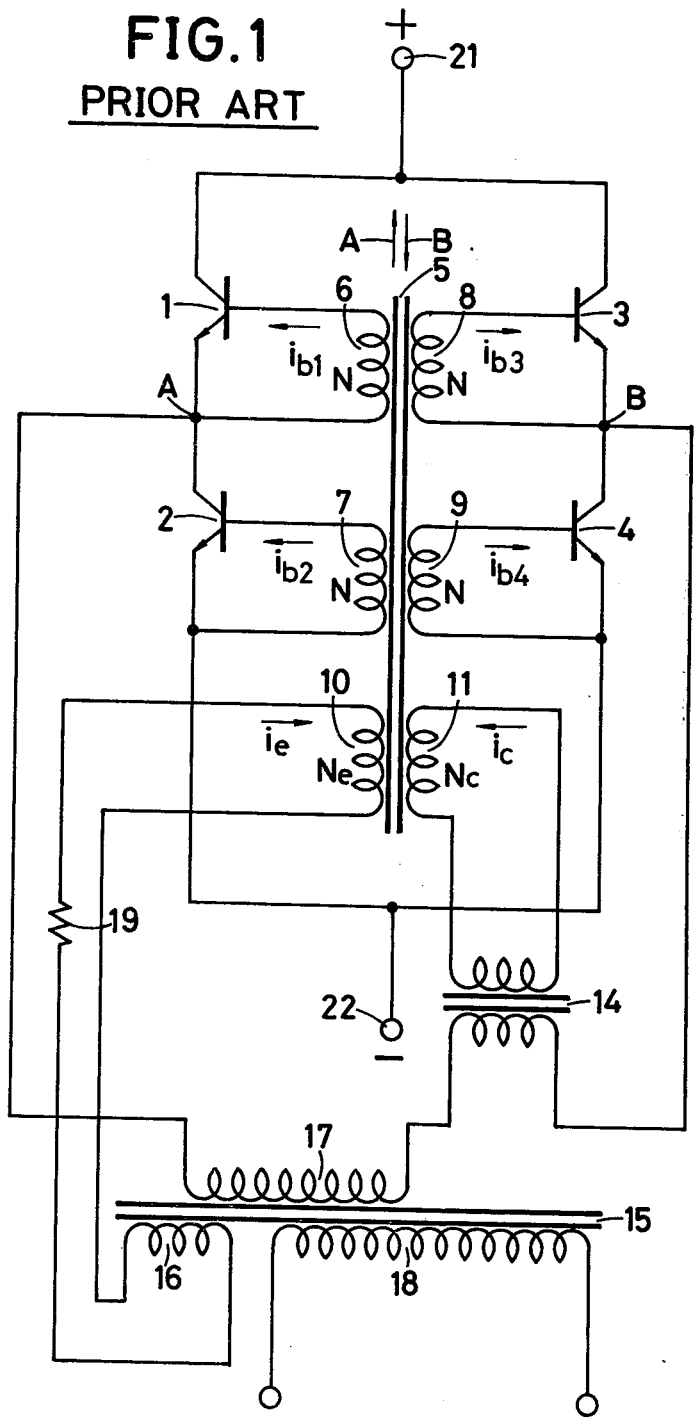
FIG. 1 is a circuit diagram of a conventional full bridge inverter circuit.
Figure 2:
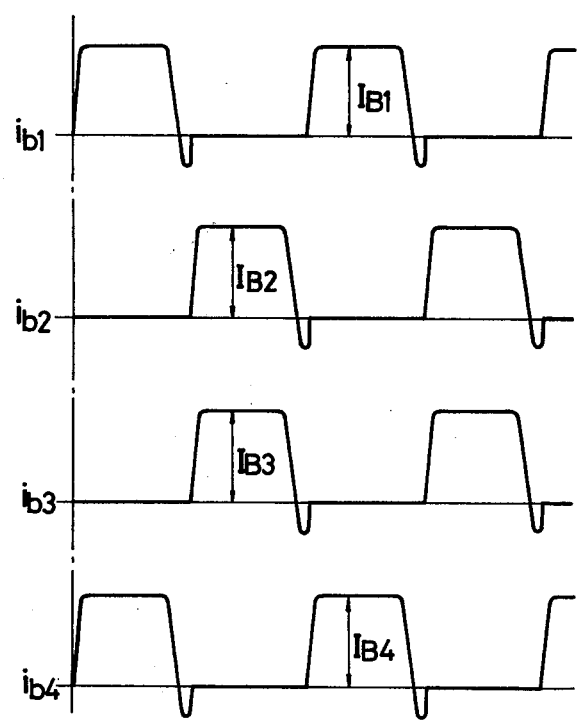
FIG. 2 is a waveform diagram for explaining the operation of the circuit of FIG. 1.

Preferred embodiments will now be described with reference to the drawings. In these embodiments, the parts which correspond to parts in FIG. 1, are denoted by the same terms and reference numerals, and are not described in detail hereinafter.

A first embodiment will be described with reference to FIG. 3.

The full bridge inverter circuit has transformers 24 and 25 which are provided additionally to the inverter circuit of FIG. 1. The transformer 24 has windings 26 and 27, and the transformer 25 has windings 28 and 29. The winding 26 is connected between the base of the transistor 1 and the winding 6 of the transformer 5, the winding 27 is connected between the base of the transistor 2 and the winding 7, the winding 28 is connected between the base of the transistor 3 and the winding 8, and the winding 29 is connected between the base of the transistor 4 and the winding 9. Accordingly, the transformer 24 couples the base current of the transistor 1 and the base current of the transistor 2 with each other, and the transformer 25 couples the base current of the transistor 3 and the base current of the transistor 4 with each other.

Figure 3:
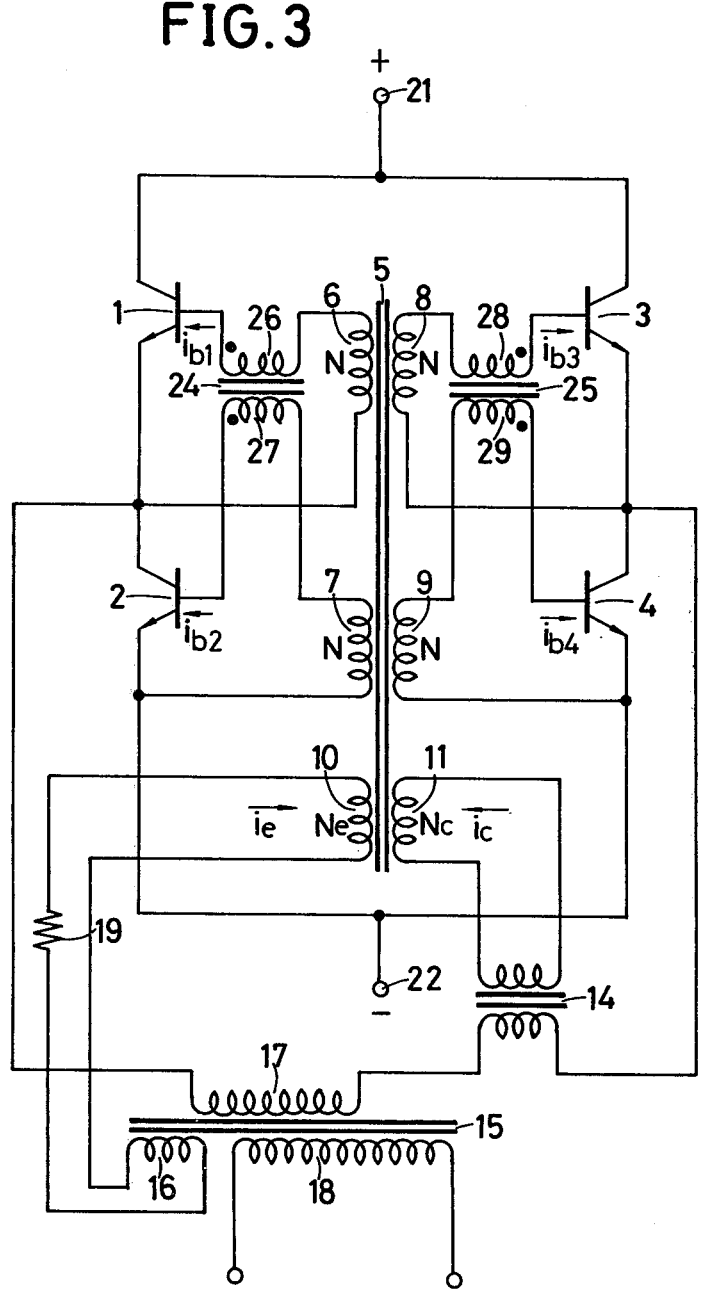
FIG. 3 is a circuit diagram of an inverter circuit according to a first embodiment of this invention.

The windings of the transformers 24 and 25 are so wound that the base currents $i_{b1} \sim i_{b4}$ shown in FIG. 3 have the following relations:

$$i_{b1} = -i_{b2}$$

$$i_{b3} = -i_{b4}.$$

Accordingly, while the base current $i_{b1}$ which puts the transistor 1 into the on-state is flowing, the base current $-i_{b2}$ is compulsorily made to flow, which puts the transistor 2 into the off-state. In contrast with this, while the base current $i_{b2}$ which puts the transistor 2 into the on-state is flowing, the base current $-i_{b1}$ is compulsorily made to flow, which puts the transistor 1 into the off-state. Similarly, while the base current $i_{b3}$ which puts the transistor 3 into the on-state is flowing, the base current $-i_{b4}$ is compulsorily made to flow, which puts the transistor 4 into the off-state. In contrast with this, while the base current $i_{b4}$ which puts the transistor 4 into the on-state is flowing, the base current $i_{b3}$ is compulsorily made to flow, which puts the transistor 3 into the off-state.

Therefore, for example, when the transistor 4 turns into the off-state and the transistors 2 and 3 are going to turn into the on-state, even though the transistor 1 still remains on, due to the condition of the base currents ($I_{B1} > I_{B4}$) which results in the remaining base storage charges being not discharged, the base current $i_{b2}$ which puts the transistor 2 into the on-state makes the base current $-i_{b1}$ compulsorily flow through the base of the transistor 1. Thus, the transistor 1 turns into the off-state. Therefore, the flow of longitudinal current due to the simultaneous turning into the on-state of the transistors 1 and 2 is prevented, and the flow of longitudinal current due to the simultaneous turning into the on-state of the transistors 3 and 4 is prevented. It improves the efficiency of the inverter.

A second embodiment will be described with reference to FIG. 4.

The full bridge inverter circuit has transformers 31 and 32 instead of the transformers 24 and 25 of FIG. 3. The transformer 31 has windings 33 and 34, and the transformer 24 has windings 35 and 36. The winding 33 is connected between the base of the transistor 1 and the winding 6, the winding 34 is connected between the base of the transistor 3 and the winding 8, the winding 35 is connected between the base of the transistor 2 and the winding 7, and the winding 36 is connected between the base of the transistor 4 and the winding 9. Accordingly, the transformer 31 couples the base current of the transistor 1 and the base current of the transistor 3 with each other, and the transformer 32 couples the base current of the transistor 2 and the base current of the transistor 4 with each other.

Figure 4:
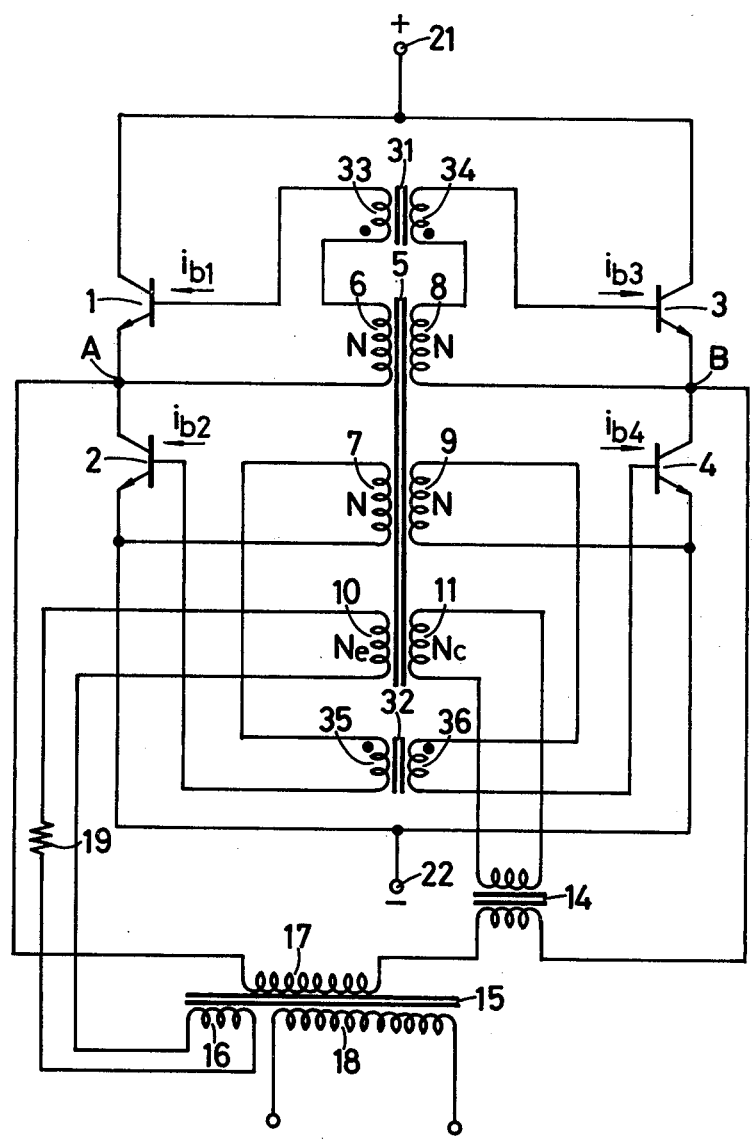
FIG. 4 is a circuit diagram of an inverter circuit according to a second embodiment of this invention.

The windings of the transformers 31 and 32 are so wound that the base currents $i_{b1} \sim i_{b4}$ shown in FIG. 4 have the following relations:

$i_{b1} = -i_{b3}$ $i_{b2} = -i_{b4}$

The operation of the circuit is similar to the first embodiment.

In this case, for example, when the transistor 4 turns into the off-state and the transistors 2 and 3 are going to turn to the on-state, even though the transistor 1 still remains on, due to the remaining base storage charges being not discharged, the base current $i_{b3}$ which puts the transistor 3 into the on-state makes the base current $-i_{b1}$ compulsorily flow through the base of the transistor 1. Thus, the transistor 1 turns into the off-state. Therefore, the flow of longitudinal current due to the simultaneous turning into the on-state of the transistors 1 and 2 is prevented, and the flow of longitudinal current due to the simultaneous turning into the on-state of the transistors 3 and 4 is prevented.

A third embodiment will be described with reference to FIG. 5.

The full bridge inverter circuit has transformers 41 and 42 instead of the transformers 24 and 25 of FIG. 3 or the transformers 31 and 32 of FIG. 4. The transformer 41 has windings 43 and 44, and the transformer 42 has windings 45 and 46. The winding 43 is connected between the base of the transistor 1 and the winding 6, the winding 44 is connected between the base of the transistor 4 and the winding 9, the winding 45 is connected between the base of the transistor 3 and the winding 8, and the winding 46 is connected between the base of the transistor 2 and the winding 7. Accordingly, the transformer 41 couples the base current of the transistor 1 and the base current of the transistor 4 with each other, and the transformer 42 couples the base current of the transistor 2 and the base current of the transistor 3 with each other.

Figure 5:
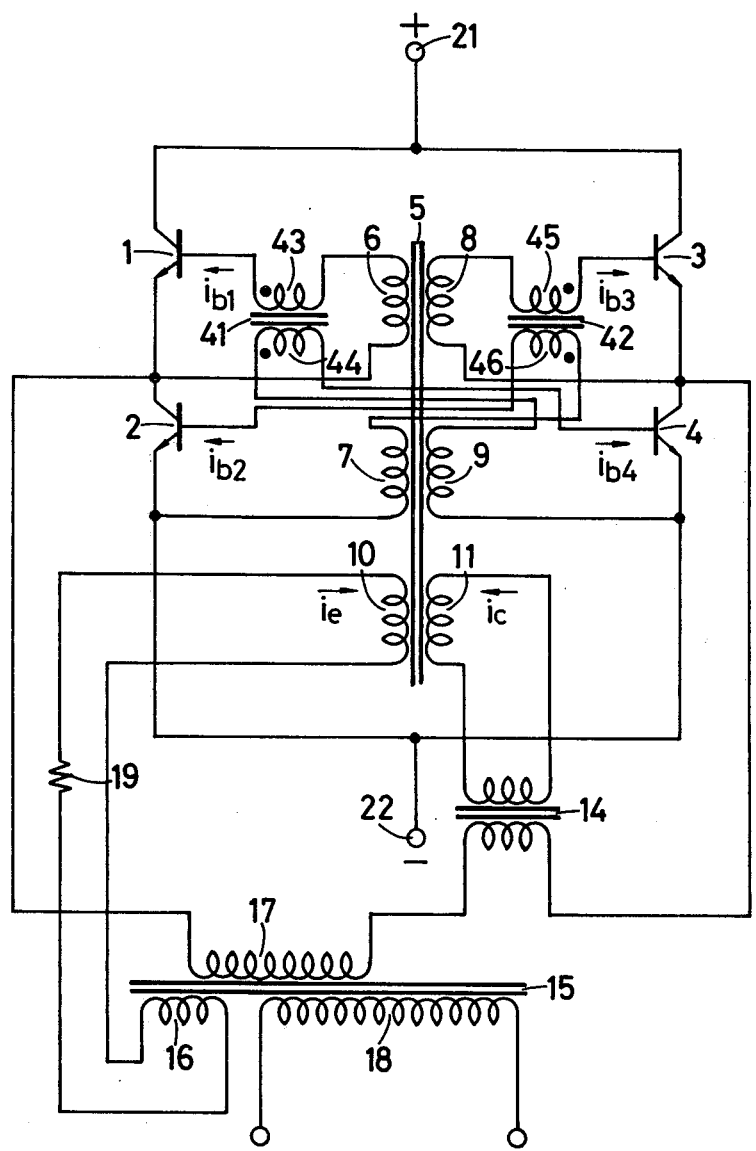
FIG. 5 is a circuit diagram of an inverter circuit according to a third embodiment of this invention.

The windings of the transformers 41 and 42 are so wound that the base currents $i_{b1} \sim i_{b4}$ shown in FIG. 5 have the following relations:

$i_{b1} = i_{b4}$ $i_{b2} = i_{b3}$.

Accordingly, while the base current $i_{b1}$ which puts the transistor 1 into the on-state is flowing, the base current $i_{b4}$ equivalent to $i_{b1}$ is supplied to the base of the transistor 4 to put the transistor 4 into the on-state. In contrast with this, while the base current $i_{b4}$ which puts the transistor 4 into the on-state is flowing, the base current $i_{b1}$ equivalent to $i_{b4}$ is supplied to the base of the transistor 1 to put the transistor 1 into the on-state. Similarly, while the base current $i_{b2}$ which puts the transistor 2 into the on-state is flowing, the base current $i_{b3}$ equivalent to $i_{b2}$ is supplied to the base of the transistor 3 to put the transistor 3 into the on-state. In contrast with this, while the base current $i_{b3}$ which puts the transistor 3 into the on-state is flowing, the base current $i_{b2}$ equivalent to $i_{b3}$ is supplied to the base of the transistor 2 to put the transistor 2 into the on-state.

As a result, even when the cases, $i_{b1} \neq i_{b4}$ or $i_{b2} \neq i_{b3}$ ($I_{B1} \neq I_{B4}$ or $I_{B2} \neq I_{B3}$) occur due to the unbalance between the base-emitter characteristics caused by thermic circumstances or differences in the characteristics of each transistor, the conditions, $i_{b1} = i_{b4}$ and $i_{b2} = i_{b3}$ ($I_{B1} = I_{B4}$ and $I_{B2} = I_{B3}$) are made by the operations of the transformers 41 and 42. It means that the longitudinal current due to the difference in amount of the base storage charges in the case of $I_{B1} > I_{B2}$, never flows. Thus, the longitudinal current is prevented by compelling to establish the condition, $I_{B1} = I_{B4}$ and $I_{B2} = I_{B3}$.

Figure 6:
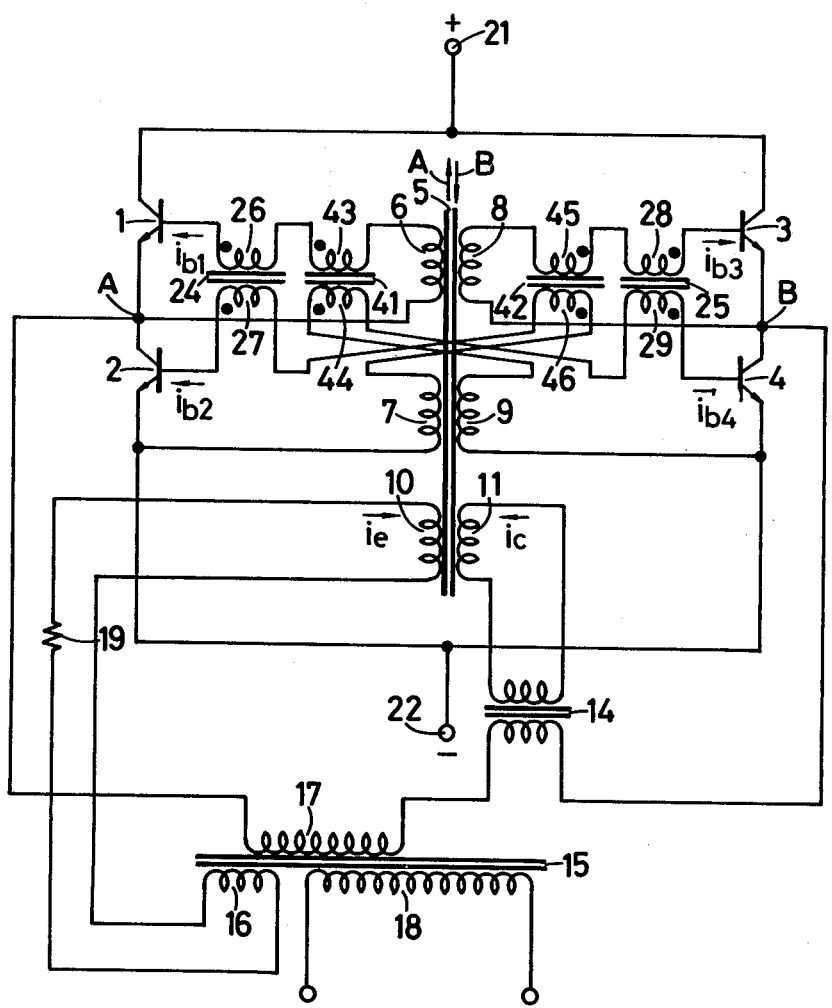
FIG. 6 is a circuit diagram of an inverter circuit according to a fourth embodiment of this invention.

Next, a fourth embodiment will be described with reference to FIG. 6.

The full bridge inverter circuit is a combination of the circuits of the first embodiment and the third embodiment. The inverter circuit has transformers 24 and 25 and transformers 41 and 42, and it can achieve both effects of the first embodiment and the third embodiment.

Windings 26 and 43 are connected in series between the base of the transistor 1 and the winding 6, windings 27 and 46 are connected in series between the base of the transistor 2 and the winding 7, windings 28 and 45 are connected in series between the base of the transistor 3 and the winding 8, and windings 29 and 44 are connected in series between the base of the transistor 4 and the winding 9.

The windings of the transformers 24, 25, 41 and 42 are respectively wound in the similar manner to the first embodiment and the third embodiment. The occurrence of the longitudinal current is prevented by the transformers 41 and 42, and moreover it is prevented by the transformers 24 and 25. Therefore, the occurrence of the longitudinal current is doubly prevented.

Figure 7:
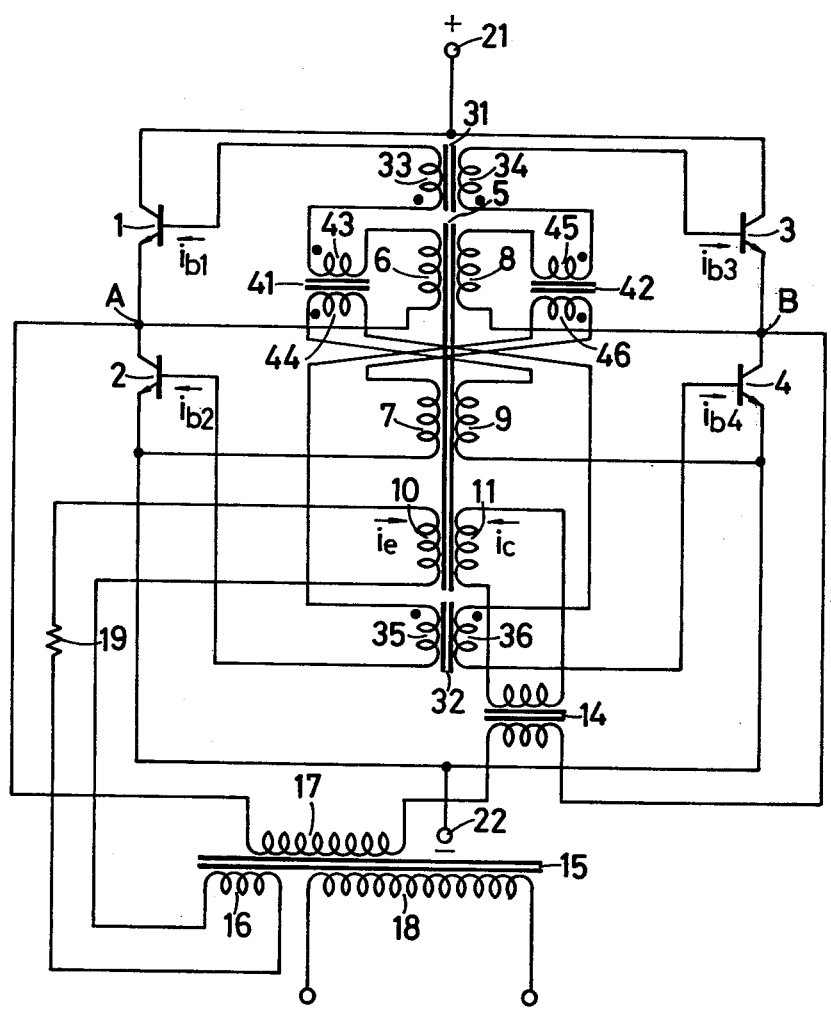
FIG. 7 is a circuit diagram of an inverter circuit according to a fifth embodiment of this invention.

Next, a fifth embodiment according to this invention will be described with reference to FIG. 7.

The full bridge inverter circuit is a combination of the circuits of the second embodiment and the third embodiment. The inverter circuit has transformers 31 and 32 and transformers 41 and 42. Windings 33 and 43 are connected in series between the base of the transistor 1 and the winding 6, windings 34 and 45 are connected in series between the base of the transistor 3 and the winding 8, windings 35 and 46 are connected in series between the base of the transistor 2 and the winding 7, and windings 36 and 44 are connected in series between the base of the transistor 4 and the winding 9.

The windings of the transformers 31, 32, 41 and 42 are respectively wound in the similar manner to the second embodiment and the third embodiment. The occurrence of the longitudinal current is prevented by the transformers 31 and 32, and moreover it is prevented by the transformers 41 and 42. Therefore, the occurrence of the longitudinal current is doubly prevented like the fourth embodiment.

Next, a sixth embodiment according to this invention will be described with reference to FIG. 8.

In this embodiment, the invention is applied to a half bridge inverter circuit. The half bridge inverter circuit comprises transistors 3 and 4 arranged in cascade connection between the power supply terminals 21 and 22, and capacitors $C_1$ and $C_2$ connected in series between the terminals 21 and 22. The other parts are the same with the full bridge inverter circuit of the first embodiment, and almost similar operation to the first embodiment is performed. The transistors 3 and 4 arranged in the cascade connection are alternately switched on and off for producing an alternate current flowing through the winding 17 in one direction and the opposite direction so as to obtain an alternate output voltage across the winding 18. The alternate current of the inverter flows through the power supply terminal 21 → transistor 3 → winding 17 → capacitor $C_2$ → power supply terminal 22, when the transistor 3 is put into the on-state, and through the power supply terminal 21 → capacitor $C_1$ → winding 17 → transistor 4 → power supply terminal 22, when the transistor 4 is put into the on-state.

The half bridge inverter circuit has a transformer 25 of which winding 28 is connected between the base of the transistor 3 and the winding 8, and winding 29 is connected between the base of the transistor 4 and the winding 9. Thus, the transformer 25 couples the base current of the transistor 3 and the base current of the transistor 4 with each other.

Figure 8:
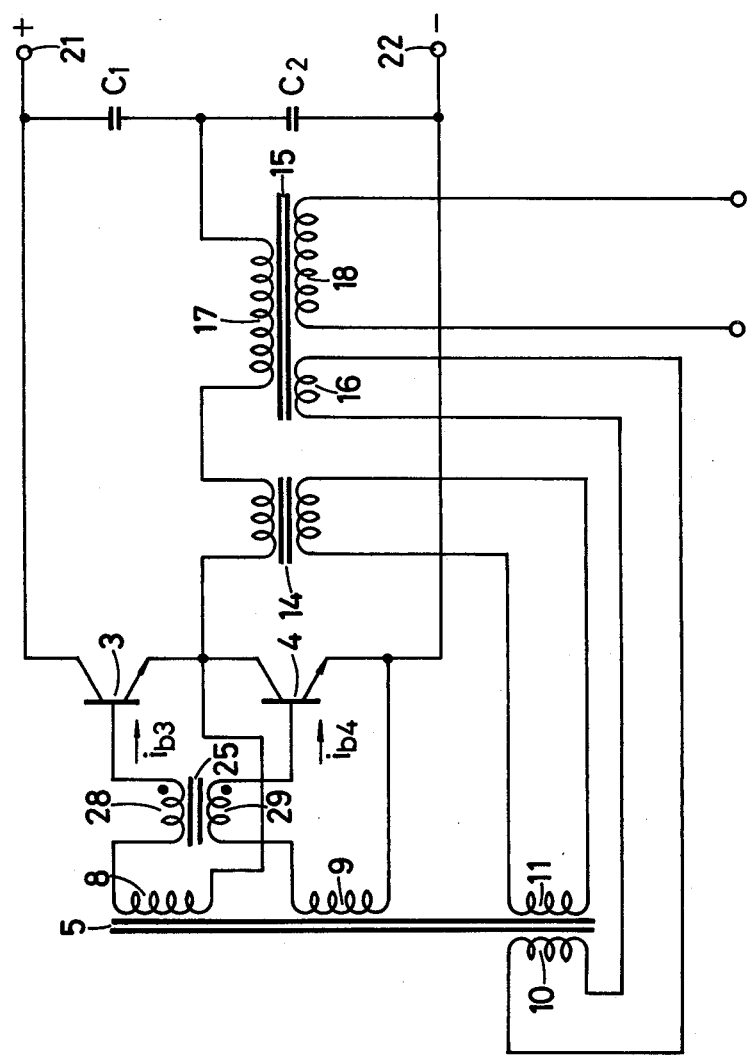
FIG. 8 is a circuit diagram of an inverter circuit according to a sixth embodiment of this invention.

The windings of the transformer 25 is so wound that the base currents $i_{b3}$ and $i_{b4}$ shown in FIG. 8 has the following relation:

$$i_{b3} = -i_{b4}.$$

Accordingly, while the base current $i_{b3}$ which puts the transistor 3 into the on-state is flowing, the base current $-i_{b4}$ is compulsorily made to flow, which puts the transistor 4 into the off-state. In contrast with this, while the base current $i_{b4}$ which puts the transistor 4 into the on-state is flowing, the base current $-i_{b3}$ is compulsorily made to flow, which puts the transistor 3 into the off-state.

Therefore, for example, when the transistor 4 is going to turn into the on-state, even though the transistor 3 still remains on, due to the remaining base storage charges being not discharged, the base current $i_{b4}$ which puts the transistor 4 into the on-state makes the base current $-i_{b3}$ compulsorily flow through the base of the transistor 3. Thus, the transistor 3 turns into the off-state. Therefore, the flow of longitudinal current due to the simultaneous turning into the on-state of the transistors 3 and 4 is prevented. It improves the efficiency of the inverter.

While the preferred embodiments have been described, variations thereto will occur to those skilled in the art within the scope of the present inventive concepts which are delineated by the following claims.

For example, although the pair of the coupling transformers 24 and 25 is provided in the first embodiment (FIG. 3) of this invention, one of the coupling transformers 24 and 25 may be omitted from the first embodiment. In this case, the winding 8 of the transformer 5 is directly connected to the base of the transistor 3, and the winding 9 of the transformer 5 is directly connected to the base of the transistor 4.

I claim:

1. An inverter comprising:
   (a) a DC power source having first and second terminals;
   (b) switching means including,
      a plurality of switching devices each having first, second and third electrodes and connected between the first and second terminals of said DC power source,
      control means to supply the first electrode of each of said switching devices with control signals, respectively, and coupling means to couple said control signals to each other, selectively;
   (c) AC output means having a pair of output terminals and connected to said switching devices;
   (d) said control means including an oscillation transformer having a saturable core and a plurality of windings, said windings being connected between the first and second electrodes of said switching devices, respectively, and further including a voltage feedback winding; and
   (e) said AC output means including an output transformer having a primary winding and first and second secondary windings, said primary winding being connected to said switching devices, said first secondary winding being connected between said pair of output terminals, and said second secondary winding being connected in parallel to said voltage feedback winding.

2. An inverter according to claim 1, wherein said switching means includes a pair of switching devices each having first, second and third electrodes, and connected in series between the first and second terminals of said DC power source,
   said first electrodes being connected to said control means to be supplied with said control signals being coupled by said coupling means in opposite phase, respectively, and the junction of said switching devices being connected to said AC output means.

3. An inverter according to claim 2, wherein said switching devices includes first and second transistors each having a base, an emitter and a collector as said first, second and third electrodes, respectively,
   the bases of said first and second transistors being connected to said control means through said coupling means, the collector of said first transistor being connected to said first terminal of said DC power source,
   the emitter of said second transistor being connected to said second terminal of said DC power source, and
   the emitter of said first transistor and the collector of said second transistor being connected together to said AC output means.

4. An inverter according to claim 3, wherein said AC output means includes an output transformer having primary and secondary windings,
   the one end of said primary winding being connected to the junction of the emitter of said first transistor and the collector of said second transistor,
   the other end of said primary winding being connected to the first and second terminals of said DC power source through a pair of capacitors, respectively, and
   said secondary winding being connected between the pair of output terminals of said AC output means.

5. An inverter according to claim 2, wherein said coupling means includes a coupling transformer having first and second windings being connected to the first electrodes of said first and second switching devices, respectively,
   said first and second windings each having the same polarity.

6. An inverter according to claim 1, wherein
   said switching means includes four switching devices each having first, second and third electrodes and connected in bridge configuration, the first and second terminals of said DC power source are connected to one pair of opposite junctions of said switching devices and and AC output means is connected between the other pair of opposite junctions of said switching devices, the first electrodes being connected to said control means, but at least one pair of the first electrodes being connected to said control means through said coupling means, and the control signals supplied to the first electrodes of one pair of said switching devices and the control signals supplied to the first electrodes of the other pair of said switching devices are in opposite phase.

7. An inverter according to claim 6, wherein said coupling means couples the same phase control signals being supplied to the first electrodes of the one pair of said switching devices.

8. An inverter according to claim 6, wherein said coupling means couples the opposite phase control signals being supplied to the first electrodes of the respective ones of the one and the other pair of said switching devices.

9. An inverter according to claim 6, wherein the first electrodes of the switching devices in the opposite arms in said bridge configuration are supplied with said control signals in same phase, respectively, and the first electrodes of the switching devices in the adjoining arms in said bridge configuration are supplied with said control signals in opposite phase, respectively, said control signals being coupled by said coupling means selectively.

10. An inverter according to claim 9, wherein said coupling means couples said control signals supplied to the switching devices in said adjoining arms.

11. An inverter according to claim 9, wherein said coupling means couples said control signals supplied to the switching devices in said opposite arms.

12. An inverter according to claim 1, wherein said coupling means has at least one coupling transformer, said coupling transformer including a pair of coupling windings, one of said coupling windings being connected between said control means and the first electrode of one of said switching devices, and another of said coupling windings being connected between said control means and the first electrode of another of said switching devices.

13. An inverter according to claim 12, wherein said control means includes an oscillation transformer having a saturable core and a plurality of windings, the one end of each of said windings being connected to the first electrode of each of said switching devices through the one of said coupling windings or directly, and the other end of each of said windings being connected to the second electrode of each of said switching devices.

14. An inverter according to claim 1, wherein said oscillation transformer has further a current feedback winding, and further comprising, a current feedback transformer having primary and secondary windings, said primary winding being connected between said switching devices and the primary winding of said output transformer, and said secondary winding being connected in parallel to said current feedback winding.

15. An inverter comprising:

(a) a DC power source having first and second terminals;

(b) switching means including a plurality of switching devices each having first, second and third electrodes, and the second and third electrodes of which are connected in series between the first and second terminals of said DC power source;

(c) an input transformer having a magnetic core and a plurality of control windings and a voltage feedback winding, said control windings being connected between the first and second electrodes of said switching devices, respectively;

(d) an output transformer having a primary winding and first and second secondary windings, said primary winding being connected to said switching devices, said secondary winding being connected to a pair of output terminals and said second secondary winding being connected to said voltage feedback winding; and (e) coupling means at least including one coupling transformer which includes a pair of coupling windings, one of said coupling windings being connected between one of said control windings and the first electrode of one of said switching devices, and another of said coupling windings being connected between another of said control windings and the first electrode of another of said switching devices.

16. The inverter of claim 15 wherein said input transformer has a current feedback winding, a current feedback transformer having primary and secondary windings is provided, said primary winding being connected between said switching devices and the primary winding of said output transformer, and said secondary winding being connected in parallel to said current feedback winding.

17. The inverter of claim 16 wherein two pairs of series connected switching devices are provided and a coupling transformer is provided for each pair.

* * * * *